United States Patent [19]
Wallis

[11] 3,861,850
[45] Jan. 21, 1975

[54] FILM FORMING HEAD
[76] Inventor: Marvin E. Wallis, 5535 Longfellow Rd., Santa Barbara, Calif. 93111
[22] Filed: Sept. 5, 1972
[21] Appl. No.: 286,116

[52] U.S. Cl.................................. 425/461, 425/376
[51] Int. Cl........................... B29d 7/02, B29f 3/04
[58] Field of Search .......... 425/461, 376, 145, 380, 425/224, 462, 463, 464, 377, 378; 264/176 R, 177 R

[56] References Cited
UNITED STATES PATENTS

| | | | |
|---|---|---|---|
| 2,774,106 | 12/1956 | Bethe.............................. | 425/461 X |
| 2,971,222 | 2/1961 | Weissman...................... | 264/177 X |
| 3,085,289 | 4/1963 | Van Riper ...................... | 425/376 X |
| 3,448,183 | 6/1969 | Chisholm............................. | 264/37 |
| 3,461,496 | 8/1969 | Winstead ................................ | 425/4 |

Primary Examiner—Francis S. Husar
Assistant Examiner—David B. Smith
Attorney, Agent, or Firm—Watts, Hoffmann, Fisher & Heinke Co.

[57] ABSTRACT

An extruding head is provided for receiving viscous resin material under substantial pressure and forming a thin sheet or film which may be applied directly to and for wrapping packages or articles. Biaxially oriented strength characteristics are obtained in the film by extruding the resin material through an elongate narrow gapped orifice which extends between an interior concave wall of the cavity and a closely conforming exterior convex surface of the head body such that the film is extruded radially thereof and thus in biaxial directions. This radial extrusion pattern also causes the film to be fanned out into a sheet substantially wider than the dimensions of the extruding orifice.

16 Claims, 10 Drawing Figures

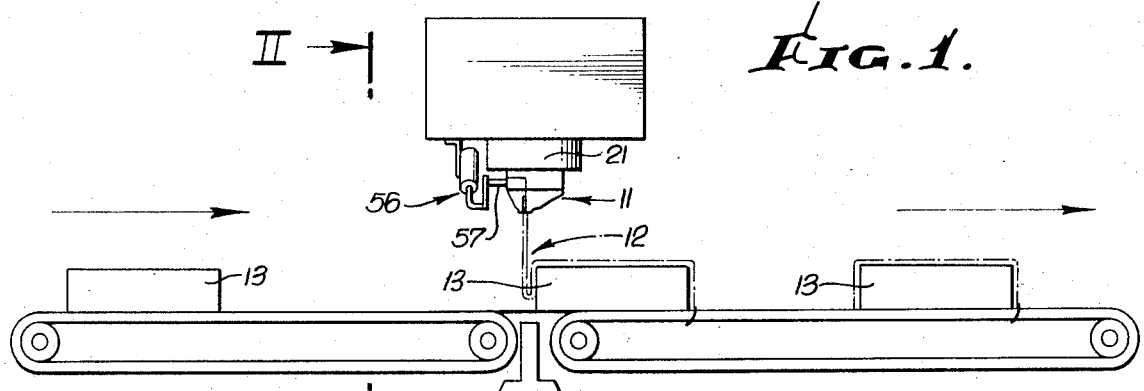
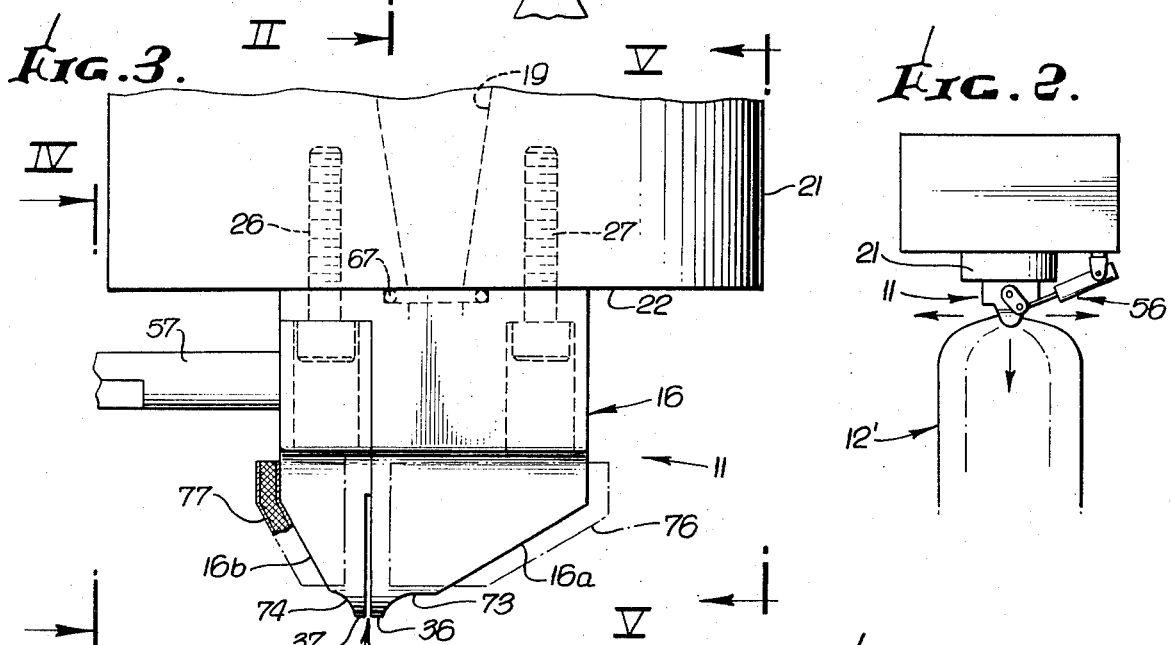
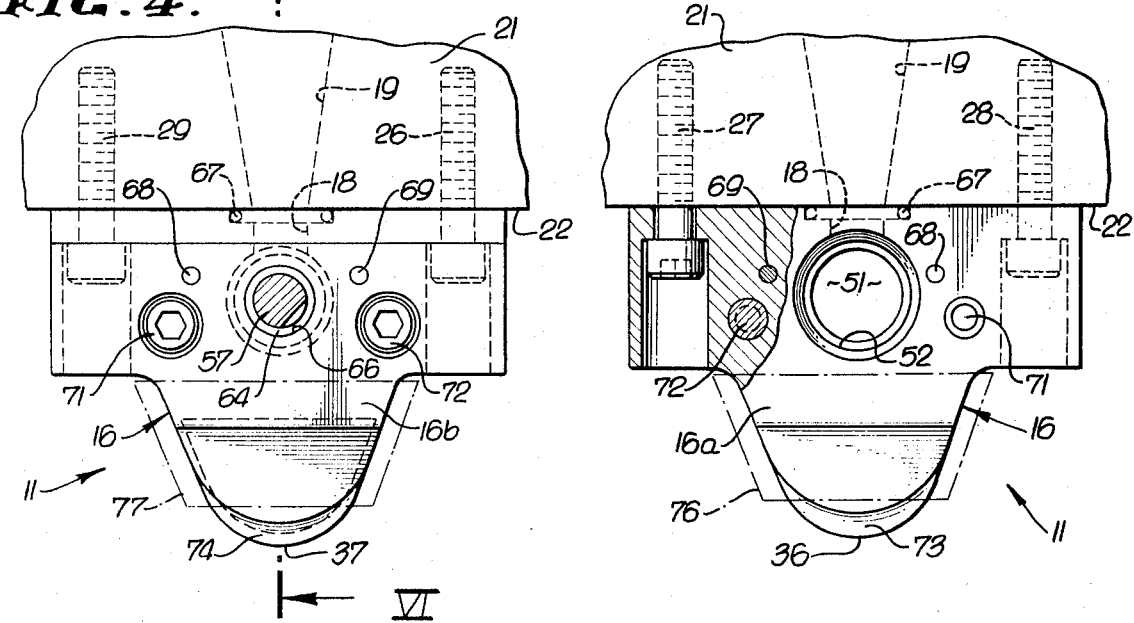

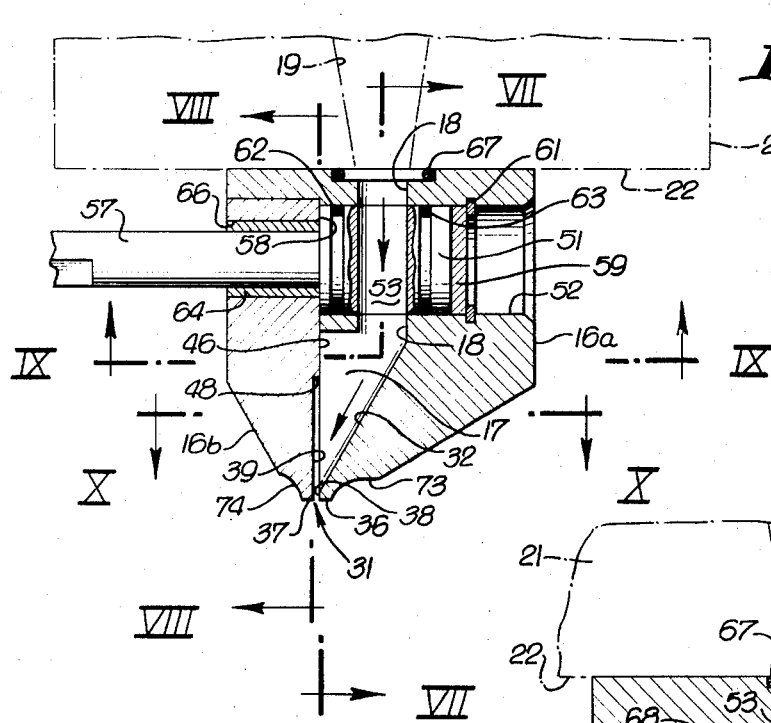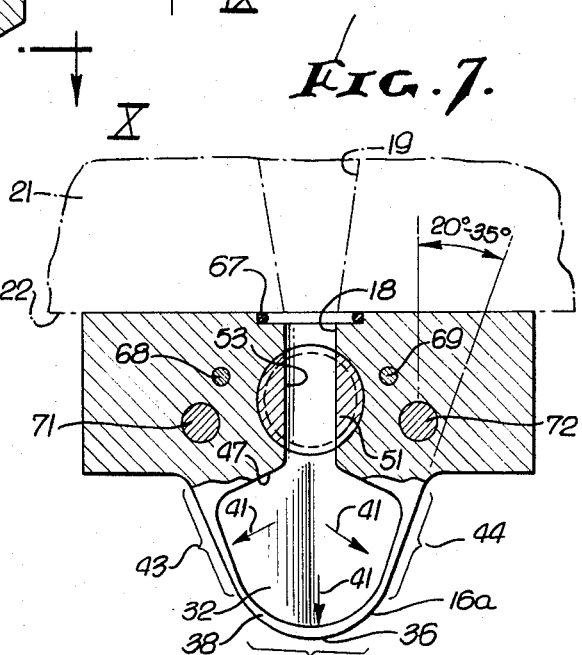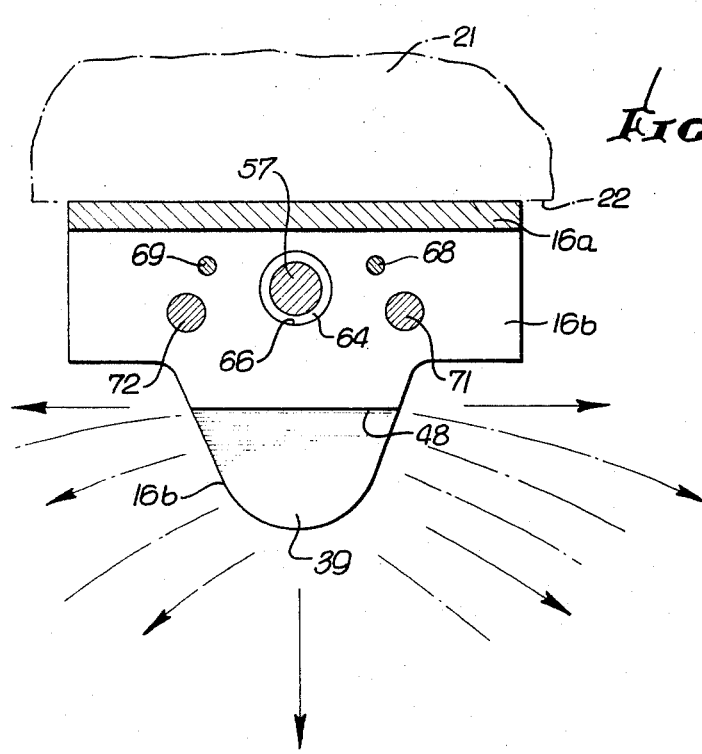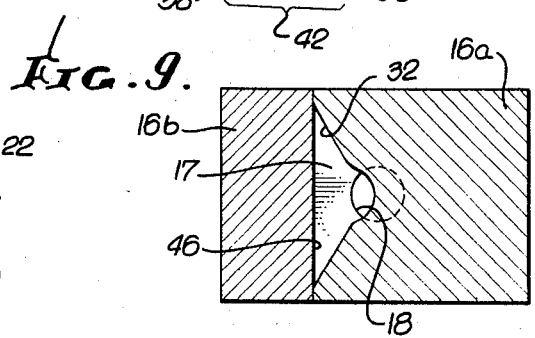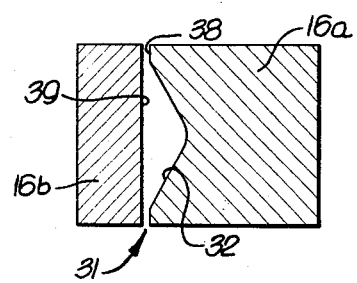

FILM FORMING HEAD

BACKGROUND OF THE INVENTION

In general the present invention relates to the forming of plastic or resin material into a desired shape from viscous resin melt. More particularly, the invention concerns an extruding head for forming this material into a thin film or sheet.

Although the film forming head of the present invention extrudes a sheet of plastic or resin material which can be cooled and wound upon rolls, the head has been devised primarily for generating a plastic film that can be started and stopped in fractions of a second for use in a packaging process. In such process, a film is extruded from a head overlying a conveyor carrying articles to be packaged. As the film is projected downwardly toward the conveyor it cools, envelopes the articles which are moving through the film as they travel along the conveyor and the film seals to the articles, thus forming a complete, neatly wrapped package.

There presently exist several techniques for producing film or sheets for general use, that is sheets wound upon rolls and dispensed as such. One method provides for extruding the film through a tubular die or a radiused die, while another extrudes the material through a flat die of selected width. In these cases the extruded film must be processed in a secondary stretching operation to produce a biaxial film. The stretching tensions the film in a direction orthogonal to the direction of extrusion as well as in a linear or straight line flow direction to produce the biaxially oriented molecular structure of the film. Without this secondary stretching, the linearly extruded film will exhibit a weak tear direction attributed to the alignment of the molecules during the extrusion process. A biaxially oriented film on the otherhand will exhibit strength in all direction of applied tear.

Furthermore, the dies used with these available extruders are designed such that they must be run constantly for the production of extended sheets of the material and can not be run intermittently on and off. The film thus extruded is generally wound upon rolls to be used later in a packaging machine or hand wrapping operation. Thus, it will be observed that several separate and independent operations are presently required to process the source material, which may be thermosetting or thermoplastic resin, before the actual wrapping state. A further shortcoming of these methods is their relatively slow rate of extrusion, making them impossible to use for final packaging processes.

One markedly superior technique for applying a thin film, or sheet wrap on the articles provides for enveloping the articles to be packaged with a film immediately after it has been extruded from a film forming head. Such a process is described in my U.S. Pat. No. 3,162,897. As set forth therein, a liquid film extruding head is provided for receiving a liquid material under pressure and forming a relatively thin film for enveloping or otherwise covering articles transported along a conveyor underlying the extruding head. Although this prior head has been found satisfactory for generating films from wax blends and low viscosity thermoplastic materials, for example in the 500 to 1,000 centipoise range, it does not provide optimum results when used in conjunction with heavier or more viscous straight resins. The structural characteristics of the head disclosed in U.S. Pat. No. 3,162,897 depended on a highly liquid state of the material for operation. In general, its design was based on a principle of deflection of the liquid so as to create a film. The heavier transparent thermosetting and thermoplastics resins, popular in modern day packaging, are not so easily formed into a film.

SUMMARY OF THE INVENTION AND ITS OBJECTIVES

Accordingly, it is an object of the present invention to provide an extruding head for producing from a central orifice a plastic sheet or film form polymer resins, particularly those having a relatively high viscosity even at elevated extruding temperatures.

It is a further object of the present invention to provide such an extruding or film forming head in which the film material is generated in such a manner that a biaxial orientation of the molecular makeup of the material results. This biaxial orientation improves the strength characteristics of the film, and in particular provides a resistance to tear in all directions of the film plane, essential in packaging.

A still further object of the present invention is to provide a film forming head wherein the film may be started ane stopped in fractions of a second. In this regard, it is a feature of the film forming head in accordance with the present invention that it may be advantageously employed in a automatic film wrapping process, generally of the type described in the above-mentioned U.S. Pat. In this type of packaging machine, the articles to be wrapped are conveyed so as to intercept the film or sheet as it is being extruded from the head. The ability to intermittently generate a film is highly desirable inasmuch as the film should only be provided when articles are available for wrapping. In the absence of articles to be wrapped, economy demands that the film forming components be temporarily interputed until a new group or batch of packages are presented.

These objects are achieved in accordance with the present invention by an extruding head which generally comprises a head body having a cavity formed therein and including an inlet passage which may be selectively and including an inlet passage which may be selectively opened by a valve member for controlled flow of viscous or plastic resin material into the cavity. An extruding orifice extends between a convex curvilinear exterior wall of the head body and a concave interior wall of the cavity conforming to and closely parelleling the exterior surface. The orifice itself is defined by gapped parallel faces, wherein one of the faces is defined by a thin lip or land separating the interior cavity wall from the exterior body surface of the head. Pressure of the material within the body cavity causes the plastic to be sequeezed outwardly through the orifice over the defined lip or land and projected at a suitable velocity radially outwardly of the exterior convex surface. In this manner the material is fanned outwardly from the head so as to develop a resin sheet having a width substantially greater than the dimensions of the head and the extruding orifice itself. Moreover, to provide the velocity of the material necessary for projecting or fanning the film outwardly of the head, the interior cavity walls converge towards the extruding orifice so as to smoothly accelerate the material as it is driven under pressure toward the orifice.

These and further objects and various advantages of the film forming head in accordance with the present invention will become apparent to those skilled in the art from a consideration of the following detailed description of an exemplary embodiment thereof. Reference will be made to the appended sheets of drawings in which:

BRIEF DESCRIPTION OF THE DRAWINGS

FIG. 1 is a front elevational view of a packaging apparatus illustrating one use of the film forming head constructed in accordance with the present invention.

FIG. 2 is a front elevation view of the film forming head of FIG. 1 taken therein along the plane II—II.

FIG. 3 is an enlarged side elevational view of the film forming head of FIG. 1.

FIG. 4 is a front view of the film forming head of FIG. 3 taken therein along the plane IV—IV.

FIG. 5 is a rear view of the film forming head of FIG. 3 taken along the plane V—V.

FIG. 6 is a vertical sectional view of the exemplary film forming head of FIGS. 3 through 5 taken along the plane VI—VI of FIG. 4.

FIG. 7 is another vertical sectional view of the film forming head of FIGS. 3 through 5 plane VII—VII of FIG. 6.

FIG. 8 is a vertical sectional view taken along the plane VIII—VIII of FIG. 6.

FIG. 9 is a horizontal sectional view of the film forming head of FIG. 6 taken therein along the plane IX—IX.

FIG. 10 is another horizontal sectional view of the film forming head of FIG. 6 taken therein along the plane X—X.

DESCRIPTION OF THE PREFERRED EMBODIMENT

With reference to FIGS. 1 and 2 the film forming head 11 constructed in accordance with the present invention is shown in combination with an automatic packaging machine, generally of the type disclosed in U.S. Pat. No. 3,162,897, and more closely of the type disclosed in my co-pending application for U.S. Pat., Ser. No. 285,140 filed Aug. 31, 1972 and entitled "Automatic Packaging Method and Apparatus" and Ser. No. 285,238 filed Aug. 31, 1972 and entitled "Method and Apparatus for Pre-Conditioning Solid Particle Resin Material for Plastic Forming." In this apparatus, head 11 extrudes and projects a sheet 12 of molten resin material which is applied directly to envelop, wrap and seal about articles 13 as illustrated. Although head 11 is advantageously employed in this combination, it may also be used to extrude a straight film or sheet 12' as illustrated in FIG. 2 in which the conveyor has been removed from beneath the extruding head, such that elongate runs of sheet 12' may be cooled and wound on a roll for later use.

The type of material suitable for use in conjunction with film forming head 11 may be any of a variety of thermoplastic or thermosetting resins. In general, the materials most commonly used in the plastic industry and which are suitable for the present invention include polyethylene, polyamides, ionomers and ethylene vinyl acetate copolymers. However, may other polymers and copolymers and highly viscous blends may be employed. For optimum results, the viscosity of the resin melt extruded from head 11 will be generally greater than 1,000 centipoise and as much as 100,000 centipoise. A temperature of 350°F to 500°F is typical for the resin melt introduced into head 11.

With reference to FIGS. 3 through 10, head 11 is provided with a body 16, here in the form of base 16a and a cap 16b which together define an internal central cavity 17 as best shown in FIG. 6. In communication with cavity 17 is an inlet passage provided by a centrally located bore 18, which in the typical mounting of head 11 will extend in a vertical direction downwardly into cavity 17 from an overlying resin supply channel 19. Channel 19 is formed in a head support 21, shown in phantom in FIGS. 6, 7 and 8, having a lower horizontal surface 22 to which head 11 is mounted by bolts 26, 27, 28 and 29 as indicated. Support 21 may be provided by the lower portion of a reservoir or chamber for temporarily storing the resin melt in a positon overlying head 11.

Thus, the highly viscous plastic or resin melt will be forced under pressure downwardly through the inlet passage of head 11 defined by bore 18 and into cavity 17 and from there it will be extruded outwardly in a thin film or sheet through gapped orifice 31 circumferentially extending about a portion of the head cavity. The geometrical configuration of cavity 17 an gapped orifice 31 is critical in producing a properly formed film. In general, the head configuration provides for extruding the film over a narrow or thin lip or land at orifice 31 separating cavity 17 from the exterior of head 11.

More particularly, cavity 17 is shaped so as to define an interior cavity wall 32 in base 16a which is concave curvilinear in a plane passing through the body, in this instance the plane being indicated by section lines VII—VII of FIG. 6. The concavity of interior wall 32 is best shown in FIG. 7 in which the plane above referred to corresponds to the plane of the drawing. In this same plane and adjacent thereto is a convex exterior surface, of the head body here in the form of surfaces 36 and 37 of base 16a and cap 16b wherein these surfaces are proximate and generally parallel to the interior cavity wall 32 within the above-mentioned plane. Thus as best shown in FIG. 7, cavity wall 32 and exterior surface 36 of base 16a define a thin land or lip 38 which is elongate in the plane of FIG. 7 and extends therein circumferentially about interior wall 32 and exterior surface 36.

Lip 38 defines in conjunction with a confronting recessed face 39 of cap 16b, the gapped orifice 31, as best shown in FIG. 6. The orifice 31 is thus comprised of that portion of face 39 which is in registration with land 38 such that the film is extruded from a centrally formed cavity 17 radially outwardly therefrom as indicated by arrows 41 in FIG. 7 through a narrow orifice which wraps circumferentially about a portion of the cavity.

To provide a preferred fanning or flaring of the film outwardly from head 11, as indicated in FIG. 11, interior wall 32 and exterior surfaces 36 and 37 are formed such that orifice 31 is comprised of a centrally disposed part-circular portion 42 and a pair of lateral straight side portions 43 and 44 generally tangent to portion 42. Thus, orifice 31 extends in it longitudinal dimension within the plane of FIG. 7 circumferentially about the portion 42 and generally linearly along the straight tangent portions 43 and 44. By this configuration, the film is extruded radially of portion 42 and generally perpendicularly from portions 43 and 44.

It has been found that the angle by which side portions 43 and 44 of the head slope away from the radial bisector of part-circular portion 42, in this instance corresponding to a vertical line centrally through the head, is important in achieving a proper fanning of the film. In particular, the longitudinal dimensions of side portions 43 and 44 here slope tangentially outwardly and away from portion 42 at an angle of 20° to 35° relative to the vertical as indicated in FIG. 7. This projects the film from sides 43 and 44 not only radially outwardly of cavity 17 but also with a component forwardly of the head, that is in this instance, downwardly and away from the head mounting.

A greater vertical inclination of side portions 43 an 44 tends to cause the film to fold or bunch along the outboard portions thereof. On the other hand a greater horizontal inclination of sides 43 and 44 may result in a film which is extruded so fast it is unmanageable.

For the presently disclosed head in which the radius of portion 42 is approximately one-half inch and where sides 43 are also approximately one-half inch, typical dimensions for the gapping of orifice 31 and the width of lip 38 are as follows. Orifice 31 may have a gap as small as 0.003 or as great as 0.025 inches between the confronting faces. As indicated, here the gap is formed by recessed face 39 on cap 16b which may be provided by grinding or other suitable means. The width of lip 38 may be in the range of 0.010 to 0.080 inches. Moreover, this width may be intentionally different at semicircular portion 42 relative to side portions 43 and 44 to achieve an aspect of control over the extruded film. In this instance, the width of lip 38 adjacent portion 42 is 0.040 inches, greater than the 0.030 inches width along the sides. The greater lip thickness 38 adjacent portion 42 tends to cause a more even distribution of the film by forcing more of the material to escape adjacent the narrower lip portion along the side.

It will thus be appreciated that the angle of slope of sides 43 and 44, the width of lip 38 and the gap spacing of orifice 31 may be adjusted relative to one another so as to control the formation of the film, primarily the thickness of film and flow rate. The angle of slope of sides 43 and 44 controls the horizontal thrust of the film as does the thickness of lip 38 therealong. An increase of the horizontal thrust or horizontal projection of the film will react like the wing flaps on an airplane and slow the velocity of film extrusion.

As a further important feature of the present invention cavity 17 is formed such that its interior walls slope or converge toward gapped orifice 31. This shaping of the cavity results in a smooth acceleration of the pressure-driven material such that it reaches orifice 31 it has attained a suitable discharge velocity. In particular, interior cavity wall 32 is shaped such that together with a confronting wall 46 and recessed face 39 of cap 16b, cavity 17 is defined with a centermost region of greatest cross-section, here lying proximate to bore 18 and remote from extruding orifice 31. From this centermost location, interior cavity wall 32 is sloped toward the plane of orifice 31 in a radially outward direction so as to circumferentially intersect orifice 31 and join with lip 38 as indicated in FIGS. 6, 7 9 and 10.

The upper portion of cavity 17 is here bounded by a wall 47 formed in base 16a which extends outwardly from a region of intersection of bore 18 therewith toward the upper extents of sides 43 and 44 as shown in FIG. 7. The limits of orifice 31 at the upper extents of side portions 43 and 44 is defined by an upper shoulder 48 of recessed face 39 which shoulder will be disposed approximately at the junction of wall 47 with side portions 43 and 44 of lip 38.

Although head 11 is here disclosed with a unilateral cavity 17 formed substantially within base 16a, an alternative head construction (not shown) would provide for a complimentary cavity portion within cap 16b such that both interior walls defining the cavity would slope toward the extruding orifice. Bore 18, can be rectangular or elongate oval in shape, matching such dual cavities, so that flow of plastic through lip 38 would be smooth and uninterrupted.

Preferably housing 11 is provided with a valve mounted as closely as possible to cavity 17 for interrupting the flow of viscous resin thereto for abrupt turn-on and turn-off of the extruded film. Here this is advantageously provided by a spool valve or cylinder 51 rotatably mounted within a bore 52 extending transversely to and intersecting bore 18. Cylinder 51 is provided with a valve opening 53 extending transversely to the cylinder such that it may be aligned with bore 18 as illustrated in FIG. 6 to accommodate a free flow of resin fluid downwardly into cavity 17. Preferably, bore 18 and valve opening 53 extend in their longitudinal dimension in general alignment with orifice 31, entering cavity 17 at a location remote therefrom. This permits a smooth flow of the highly viscous resin directly through cavity 17 to its point of extrusion at gapped orifice 31.

Cylinder 51 is rotatable by an actuator 56 as shown in FIGS. 1 and 2 operating on an axial stem 57 connected to the cylinder so as to selectively rotate it approximately one-fourth of a turn to misalign opening 53 and thereby close or block the inlet passage defined by bore 18.

Valve or cylinder 51 is retained within head 11 by an abutment of the axial end thereof at stem 57 against an end wall 58 of bore 52 defined by wall 46 of cap 16b and at the other end by a spacer 59. A retainer ring 61 is mounted within bore 52 as illustrated in FIG. 6 to secure spacer 59. Sealing means, here in the form of spring loaded teflon rings in O-ring grooves 62 and 63 circumferentially extending about valve or cylinder 51 are provided to prevent the escape of fluid outwardly of bore 52. This area between rings 62 and 63 may be tapered with spring loaded rings located at ends of taper.

Stem 57 is rotatably mounted within a bushing 64 which in turn is disposed within a bore 66 of cap 16b as illustrated. Sealing means are also provided between an upper portion of bore 18 and support 21, here in the form of an O-ring 67.

Cap 16b is aligned with and secured to base 16a by a pair of dowel pins 68 and a pair of bolts 71 and 72, with wall 46 abutting a surface of base 16a in the plane of lip 38.

To prevent heavy accumulation of the resin material on the exit side of orifice 31, base 16a and cap 16b are provided with circumferentially extending grooves 73 and 74 so as to reduce the area of surfaces 36 adn 37 adjacent the orifice and thereby inhibit accumulation of material thereon.

As the resin is delivered to the cavity of head 11 in a melted viscous condition at an optimum high temperature, it is important to maintain this temperature at the extruding orifice. For this purpose thermostatically controlled base and cap heater elements 76 and 77, shown in phantom in FIGS. 3, 4 and 5 are mounted to the base of cap respectively of the head. The material is thus accurately maintained at the optimum extruding temperature, for example 400° F, up until it is discharged through orifice 31.

Accordingly, with head 11 constructed in the above described manner, it is possible to generate a film or sheet having a width which is 5 to 20 times the longitudinal dimension of orifice 31, that is the length of the orifice stretched out in a straight line. In contrast, conventional extruders require a die length which equals the width of the film to be produced. Furthermore, such conventional dies produce only linear film. Head 11 on the other hand exhibits directions of film extrusion which have biaxial components, as indicated in FIGS. 2, 4 and 7 which provide for a superior film that is tougher and clearer than a linearily extruded film.

A further important advantage of the film forming head 11 relates to its employment in the packaging illustrated in FIG. 1. Since the film or sheet 12 is extruded through gapped orifice 31 having a gap dimension of only 3 to 25 thousands of an inch and is then stretched by the outward thrust of the pressure driving the film to a width of 5 to 20 inches, the mass of the film is spread to thin that heat is dissipated rapidly upon leaving the orifice. For example, from a temperature of 400°F for the molten material within cavity 17 of the head, a drop to a temperature of around 140°F will be attained by the time the film reaches the article to be packaged. This would be for ambient conditions of 70° to 80°F. For packaging foodstuffs and other temperature sensitive items, it is extremely important to apply the film to the article, such as meats and fruits and the like, at a temperature substantially under the 400° required to extrude the film. This temperature drop is however achieved during the fan out of the film by head 11.

It is understood that the present invention has been disclosed by reference to a particular and preferred embodiment thereof, and modifications and design changes may be made to the disclosed embodiment without departing from the scope of the invention.

I claim:

1. In a film forming head for receiving a viscous resin material under substantial pressure and forming a thin extruded sheet thereof via an extruding orifice, in which head portions define an internal cavity and a discharge orifice, the improvement wherein a head portion has a convex curved peripheral portion and a straight peripheral portion tangent to each end of said curved portion, and an elongated orifice extending along and through said curved and straight peripheral portions communicating with said internal cavity.

2. A film forming head as set forth in claim 1, including a concave portion adjacent said gap, at least in part defining said cavity and an adjacent lip portion forming a juncture therewith, internally of the head, said juncture being inwardly of and closely conforming in shape with the exterior surface of the head portions that define the orifice.

3. A film forming head as set forth in claim 2, wherein the cavity is defined by a flat wall in a plane passing through said orifice and by an opposed concave wall.

4. A film forming head as set forth in claim 2 wherein said lip portion is flat and extends from said juncture to the exterior surface of the head along the full length of the orifice.

5. In a film forming head for receiving a viscous resin material under substantial pressure and forming a thin extruded sheet thereof via an extruding orifice, in which head portions define the orifice and an internal cavity that opens through said orifice, the improvement comprising head portions shaped to create said orifice in the form of a narrow elongated gap with a central portion that extends along a part-circular path and two end portions contiguous with the central portion that extend tangentially to and outwardly from the part-circular path at an angle of 20°–35° away from an imaginary radial line bisecting the path of said central portion, said head portions and orifice serving to direct extruded resin material biaxially and form a sheet substantially wider than the orifice.

6. In a film forming head for receiving a viscous resin material under substantial pressure and forming a thin extruded sheet thereof via an extruding orifice, in which head portions define the orifice and an internal cavity that opens through said orifice, the improvement comprising head portions shaped to create said orifice in the form of a narrow elongated gap with a central portion that extends along a part-circular path and two end portions contiguous with the central portion that extend tangentially to and outwardly from the part-circular path, a concave portion adjacent said gap, at least in part defining said cavity and an adjacent lip portion forming a juncture therewith, internally of the head, said juncture being inwardly of and closely conforming in shape with the exterior surface of the head portions that define the orifice, said lip portion being flat and extending from said juncture to the exterior surface of the head along the full length of the orifice, and the width of said lip between said juncture ane said exterior surface being greater along the central portion of the gap than along the end portions, said head portions and orifice serving to direct extruded resin material biaxially and form a sheet substantially wider than the orifice.

7. In a film forming head for receiving a viscous resin material under substantial pressure and forming a thin extruded sheet thereof via an extruding orifice, in which head portions define the orifice and an internal cavity that opens through said orifice, the improvement comprising head portions shaped to create said orifice in the form of a narrow elongated gap with a central portion that extends along a part-circular path and two end portions contiguous with the central portion that extend tangentially to and outwardly from the part-circular path, a concave portion adjacent said gap, at least in part defining said cavity and an adjacent lip portion forming a juncture therewith, internally of the head, said juncture being inwardly of and closely conforming in shape with the exterior surface of the head portions that define the orifice, said lip portion being flat and extending from said juncture to the exterior surface of the head along the full length of the orifice, said cavity further being formed by an interior wall confronting said lip and having a greater cross-section remote from said orifice than proximate said orifice, the concave portion forming the juncture with the lip being sloped from centrally of the cavity toward said confronting wall in an outward direction to the lip, whereby said cavity converges from a central region toward said orifice to provide for smooth acceleration of the viscous resin material within the head in a direction toward the orifice, said head portions and orifice serving to direct extruded resin material biaxially and form a sheet substantially wider than the orifice.

8. A film forming head as set forth in claim 7 wherein an inlet passage enters said cavity at a location remote from said orifice and in general alignment therewith.

9. In a film forming head for receiving a viscous resin material under substantial pressure and forming a thin extruded sheet thereof via an extruding orifice, in which head portions define an internal cavity and a discharge orifice, the improvement wherein a head portion has a convex curved peripheral portion and a straight peripheral portion tangent to each end of said curved portion, and a continuous elongated orifice extending along said curved and straight peripheral portions and located in a plane through said curved and straight peripheral portions, said orifice communicating with said internal cavity.

10. A film forming head for receiving viscous resin material under pressure and forming a resin film therefrom comprising:
   a body having a cavity formed therein with an interior wall which is concave in a plane passing through said body, the exterior of said body being formed with a surface which is convex in said plane and generally parallels said interior cavity wall;
   an extruding orifice extending between said exterior surface and interior wall and being elongate in said plane;
   an inlet passage formed in said body extending into said cavity;
   said concave interior cavity wall and convex exterior body surface defining a centrally disposed arcuate portion and lateral side portions generally tangent to said central portion, said orifice extending in its longitudinal dimension along said dide and central portions;
   whereby resin material is receivable in said cavity an will extrude radially outwardly from said cavity through said orifice to form a sheet of resin film and the orifice at said central portion will project the extruded film generally radially thereof while the orifice along said lateral side portions will project it substantially perpendicularly therefrom.

11. A film forming head as set forth in claim 10 wherein said side portions slope tangentially outwardly and away from said central portion so as to project extruded film laterally outwardly and forwardly of the head.

12. A film forming head as set forth in claim 11 wherein each said side portion slopes at an angle of 20°–35° away from an imaginary radial line bisecting said central portion.

13. A film forming head as set forth in claim 10 wherein confronting but spaced faces of said body substantially parallel to said plane define the orifice, at least one of said faces includes a lip connecting said exterior surface with said interior cavity wall, and the lip has a greater width along said central portion than along said side portions.

14. A film forming head as set forth in claim 10 wherein said inlet passage enters said cavity at a location remote from said orifice and in general alignment therewith.

15. A film forming head as set forth in claim 14 further comprising means disposed in said inlet passage to interrupt flow of viscous resin material into said cavity.

16. A film forming head as set forth in claim 10 wherein said body is formed by a base part defining said interior wall and a portion of said exterior surface and defining said lip therebetween, and a cap part having an exterior surface portion mated to said portion of said exterior surface of the base part and mounted to said base part with a planar wall confronting and spaced from said lip to provide said confronting, spaced, faces of said orifice.

* * * * *

PO-1050
(5/69)

UNITED STATES PATENT OFFICE
CERTIFICATE OF CORRECTION

Patent No. 3861850                Dated   January 21, 1975

Inventor(s) Marvin E. Wallis

It is certified that error appears in the above-identified patent and that said Letters Patent are hereby corrected as shown below:

Column 2, line 25, "ane" should be -- and --;
           line 38, "interputed" should be -- interupted --;
Column 4, line 34, "an" should be -- and --;
Column 5, line 14, "an" should be -- and --;
Column 6, line 62, "adn" should be -- and --;
Column 7, line 25, "20" should be -- 30 --;
           line 26, "to" should be -- so --;
Column 8, line 36 (Claim 16), "ane" should be -- and --;
Column 9, line 37 (Claim 10), "dide" should be -- side --.

Signed and sealed this 29th day of April 1975.

(SEAL)
Attest:

RUTH C. MASON
Attesting Officer

C. MARSHALL DANN
Commissioner of Patents
and Trademarks